United States Patent
Iwai et al.

(10) Patent No.: US 8,468,908 B2
(45) Date of Patent: Jun. 25, 2013

(54) INDUSTRIAL ROBOT

(75) Inventors: Seiji Iwai, Hyogo (JP); Takayasu Ohara, Osaka (JP)

(73) Assignee: Panasonic Corporation, Osaka (JP)

( * ) Notice: Subject to any disclaimer, the term of this patent is extended or adjusted under 35 U.S.C. 154(b) by 1645 days.

(21) Appl. No.: 10/584,925

(22) PCT Filed: Nov. 29, 2005

(86) PCT No.: PCT/JP2005/021848
§ 371 (c)(1),
(2), (4) Date: Jul. 5, 2006

(87) PCT Pub. No.: WO2006/112077
PCT Pub. Date: Oct. 26, 2006

(65) Prior Publication Data
US 2008/0289443 A1    Nov. 27, 2008

(30) Foreign Application Priority Data

Mar. 30, 2005  (JP) .................................. 2005-097414

(51) Int. Cl.
*B25J 17/00* (2006.01)
*B25J 9/10* (2006.01)

(52) U.S. Cl.
USPC ......................................... 74/490.05; 901/28

(58) Field of Classification Search
USPC ............... 74/490.05, 490.06, 490.01–490.04, 74/568 R, 101.2, 83.37, 526, 527; 901/11, 901/12, 13, 28, 29; 318/568.16
See application file for complete search history.

(56) References Cited

U.S. PATENT DOCUMENTS

| | | | | |
|---|---|---|---|---|
| 2,072,877 A * | 3/1937 | Green | ......................... | 248/186.2 |
| 2,791,914 A * | 5/1957 | Cornelius | ........................ | 74/527 |
| 3,402,802 A * | 9/1968 | Lint | ................................ | 193/37 |
| 3,565,089 A * | 2/1971 | Thompson | ................. | 137/68.16 |
| 3,650,150 A * | 3/1972 | Eccles, Jr. | ..................... | 73/146.8 |
| 3,958,541 A * | 5/1976 | Lachnit | ....................... | 123/90.34 |
| 4,932,313 A * | 6/1990 | Gutknecht | ................. | 92/181 R |
| 4,955,250 A * | 9/1990 | Fisher | ......................... | 74/490.05 |
| 4,980,839 A * | 12/1990 | Souji et al. | ..................... | 700/245 |
| 5,116,018 A * | 5/1992 | Friemoth et al. | ................ | 251/90 |
| 6,394,052 B2 * | 5/2002 | Miyasaka et al. | ........... | 123/90.17 |
| 6,971,351 B2 * | 12/2005 | Kinugawa et al. | .......... | 123/90.17 |
| 2004/0079309 A1 * | 4/2004 | Kinugawa | .................. | 123/90.17 |

FOREIGN PATENT DOCUMENTS

| | | |
|---|---|---|
| DE | 297 17 628 | 2/1998 |
| JP | 2-022712 | 1/1990 |
| JP | 2-180580 | 7/1990 |

(Continued)

OTHER PUBLICATIONS

Supplementary European Search Report issued Aug. 29, 2007 in EP application 05811719.3-2316 PCT/JP2005/021848 which is a counterpart to the present application.

*Primary Examiner* — Thomas Diaz
(74) *Attorney, Agent, or Firm* — Wenderoth, Lind & Ponack, L.L.P.

(57) ABSTRACT

A joint of an industrial robot that includes attaching part (23) having positioning member (22) embedded in one or both of two relatively rotating members, and guide (24) through which positioning member (22) projectably slides. Meanwhile, the side of the positioning member is provided thereon with a reservoir groove for a lubricant and a projection position marker for indicating a given projection length. This makeup provides an inexpensive, highly accurate, and extremely trouble-saving origin adjusting device.

23 Claims, 6 Drawing Sheets

FOREIGN PATENT DOCUMENTS

| | | |
|---|---|---|
| JP | 03 121792 | 5/1991 |
| JP | 05-154781 | 6/1993 |
| JP | 6-50740 | 7/1994 |
| JP | 06-278063 | 10/1994 |
| JP | 09-225870 | 9/1997 |
| JP | 2000-288966 | 10/2000 |
| JP | 2002-239967 | 8/2002 |

* cited by examiner

INDUSTRIAL ROBOT

TECHNICAL FIELD

The present invention relates to a robot having a joint, and more particularly, to an industrial robot performing origin adjustment.

BACKGROUND ART

An industrial robot is commonly used in the industry. FIG. 10 illustrates a schematic industrial robot 100 comprising a controller 101 including a calculator 102, manipulator 103 and a robot controller. As an example for origin adjustment in a conventional industrial robot, Japanese Patent Unexamined Publication No. H02-180580 (document 1) discloses the following device. FIG. 8 illustrates a conventional origin adjusting device.

The conventional origin adjusting device shown in FIG. 8 has first member 81 and second member 82 arranged facing each other. The circumferential surface of first member 81 is provided with step 83 at a position corresponding to an origin, and second member 82 detachably fixes an origin adjusting device at a position corresponding to an origin. This origin adjusting device is composed of switch holder 85, fixed to second member 82 at a position corresponding to an origin; switching means 84 for transmitting an origin signal, held by switch holder 85; and sliding stick 87. One end of sliding stick 87 is able to engage an on-off movable element of switching means 84, and the other end is able to project toward the inside of step 83 formed at an origin-corresponding position of first member 81, guided by direct-acting bearing 86 fixed to switch holder 85.

Meanwhile, as another example for a conventional industrial robot performing origin adjustment, Japanese Patent Unexamined Publication No. 2002-239967 (document 2) illustrates an origin adjusting device as shown in FIG. 9.

The origin adjusting device shown in FIG. 9 is provided with first member 91 and second member 92 facing each other and being relatively rotatable. First member 91 is provided with attaching part 95 for detachably attaching positioning member 94. Second member 92 is provided with contacting surface 93 contacting positioning member 94. Positioning member 94 is threaded, pin-shaped, and attaching part 95 is a screw hole screwable together with positioning member 94.

However, in the makeup shown in document 1, the origin adjusting device, being detachable, requires the trouble to be prepared when origin adjustment is needed. Further, dust prevention measures need to be taken for the attaching part of the origin adjusting device because the robot body can gradually become dirty in a field. Additionally, the complicated makeup causes the origin adjusting device and the joint member of the robot to be expensive.

Installing an origin adjusting device requires a relatively large space, thus making downsizing of the robot joint difficult. Particularly at the end-effector attaching part of the robot and the wrist shaft, which is located near the attaching part, the leading end of the wrist shaft is prevented from accessing a workpiece, which is extremely disadvantageous makeup.

Meanwhile, in the makeup of document 2, although the origin adjusting device is inexpensive, the positioning member is screwed in a screw hole, and thus the fixing accuracy of the positioning member results in being dependent on the coaxialities of the thread-processed part and pin-processed part, which will bring poor positioning accuracy.

Even if some objects are produced on the basis of an identical design drawing, strictly speaking, they individually differ in dimensions due to unevenness in production and/or processing. An object with an identical shape but slightly different dimensions is referred to as "a different object belonging to a same kind." Using such an object causes deterioration in positioning accuracy, disabling stable accuracy in origin adjustment to be secured.

SUMMARY OF THE INVENTION

In order to solve the above-mentioned problems, an industrial robot according to the present invention has a first member and a second member, rotating relatively to a joint; at least the first member is provided with a hole; the hole contains a positioning member; the positioning member is slidable in the hole and projectable from the hole; and the bottom of the hole is provided with an attaching part for fixing the positioning member. The positioning member could be provided with at least one of a reservoir groove for a lubricant and a marker indicating a projection length on the side.

This makeup will implement origin adjustment inexpensive, highly accurate, extremely trouble-saving, and stable over a long duration. Further, in spite of the fact that the positioning member is incorporated in the relatively rotating member in the present invention, a signal generating device such as a switch is not required. This makeup dispenses with a special signal line for origin adjustment, thus additionally bringing advantages of not requiring cables in the robot body to be increased or changed.

As mentioned above, the present invention can implement inexpensive, highly accurate, extremely trouble-saving origin adjustment.

DETAILED DESCRIPTION OF PREFERRED EMBODIMENTS

Hereinafter, a description is made for exemplary embodiments of the present invention, with reference to the related drawings.

First Exemplary Embodiment

Figure 1:
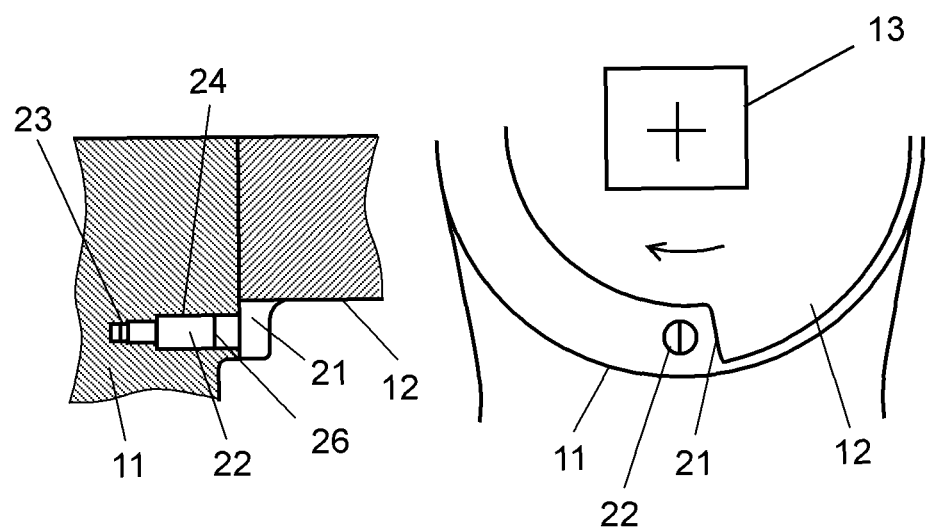
FIG. 1 is an explanatory diagram illustrating the portion of the origin adjusting device of an industrial robot in regular operation, according to the first exemplary embodiment of the present invention.
Figure 2:
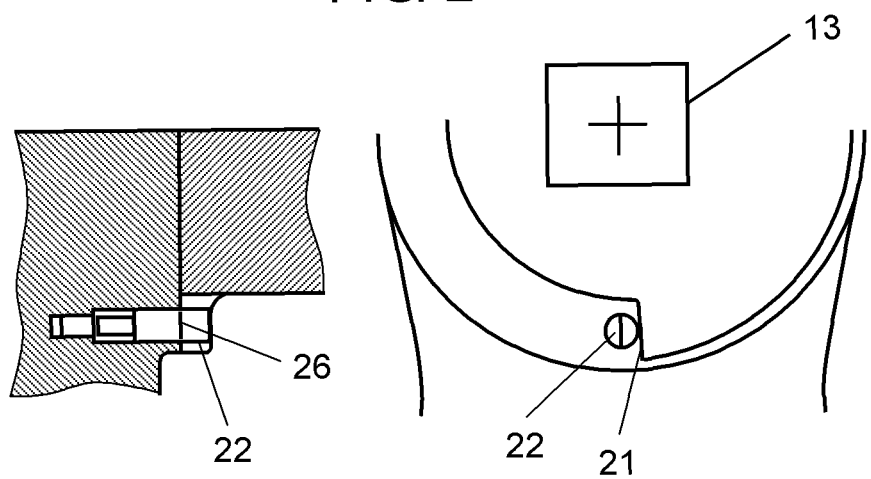
FIG. 2 is an explanatory diagram illustrating the portion of the origin adjusting device of the industrial robot in origin adjustment, according to the first exemplary embodiment of the present invention.

FIGS. 1 and 2 illustrate the portion of the origin adjusting device of a joint of an industrial robot according to the exemplary embodiment of the present invention. The origin adjusting device according to the embodiment has first member 11 and second member 12. Second member 12 is rotated, for example, by a driving motor 13. First member 11 has positioning member 22; attaching part 23 embedding positioning member 22 therein; and guide 24 allowing positioning member 22 to slide. Guide 24 is a first hole formed at first member 11. Positioning member 22 is allowed to partially project from the first hole. Meanwhile, second member 12 has contacting part 21, which is a projection interacting with (i.e. contacting) positioning member 22, when relatively rotating first member 11 and second member 12. Here, positioning member 22 and the first hole (guide 24) through which positioning member 22 slides form socket and spigot structure, which is free from mechanical backlash. Contacting part 21 is included in an interacting means. Positioning member 22 provided on first member 11, attaching part 23, and guide 24 correspond to first positioning member 22, first attaching part 23, and first guide 24, respectively.

Figure 3:
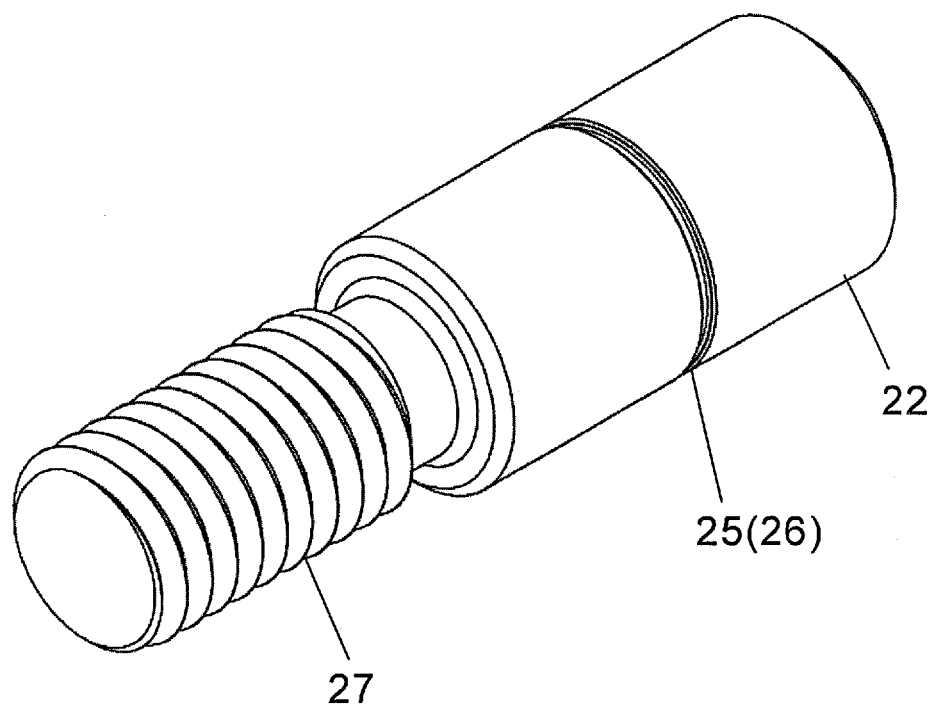
FIG. 3 illustrates a positioning member according to the first exemplary embodiment of the present invention.

FIG. 3 illustrates an example of positioning member 22 according to the embodiment. In FIG. 3, the side of positioning member 22 is provided thereon with ring-shaped groove 25, which is a reservoir (i.e. retainer) for a lubricant. One end of positioning member 22 is provided thereon with screw 27, which is screwed into attaching part 23 (i.e. screw hole) to be mounted, when positioning member 22 is embedded in first member 11.

Hereinafter, a description is made for the actions of the industrial robot with the above-mentioned makeup.

When the robot performs regular actions, first member 11 and second member 12 can perform free relative rotation as shown in FIG. 1. As a result that positioning member 22 is embedded in the inside of first member 11, dust prevention measures are simultaneously realized for positioning member 22 and guide 24.

Figure 4:
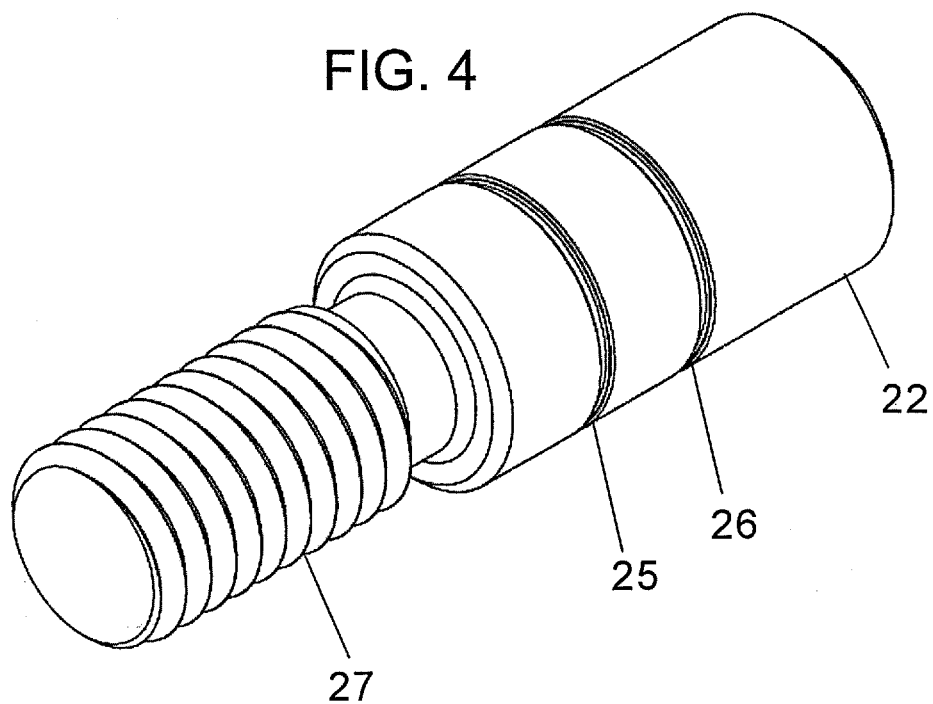
FIG. 4 illustrates a positioning member according to the first exemplary embodiment of the present invention.
Figure 5:
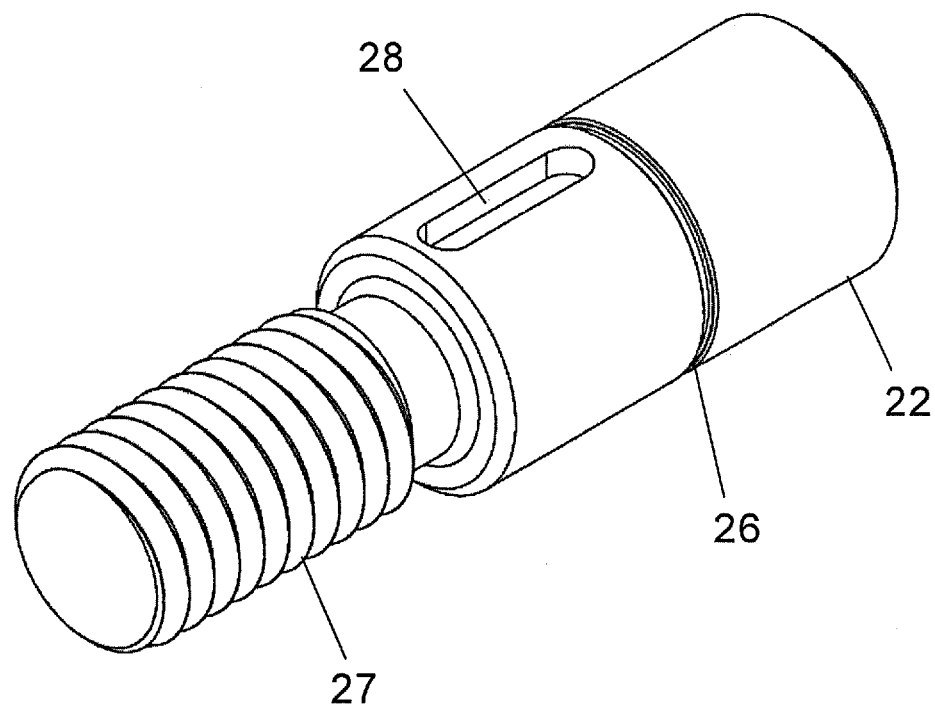
FIG. 5 illustrates a positioning member according to the first exemplary embodiment of the present invention.

Meanwhile, when origin adjustment is required, positioning member 22 is projected from first member 11 along guide 24 until projection position marker 26, provided on the side of positioning member 22 and indicating a given projection length, is exposed. Projection position marker 26 is provided so that at least part of screw 27 remains fixed to attaching part 23 even when positioning member 22 projects. Marker 26 encourages the operator to be careful so as not to cause positioning member 22 to project more than necessary. This prevents positioning member 22 from slipping downward through guide 24 due to excessive projection, thus preventing accuracy deterioration and breakage of positioning member 22. Multiple projection position markers 26 may be provided as long as positioning member 22 does not slip downward through guide 24. Reservoir groove 25 for a lubricant, which is a ring-shaped groove, can function as projection position marker 26 as well. In such a case, lubricant reservoir groove 25 and projection position marker 26 do not need to be provided individually, but one projection position marker 26 may double as lubricant reservoir groove 25. Otherwise, groove 25 and marker 26 may be individually provided as shown in FIG. 4. The lubricant reservoir groove does not need to be ring-shaped on the side of positioning member 22 as shown in FIG. 3, but it may be groove 28 that is substantially linear along the direction for tightening the screw as shown in FIG. 5. In this case, ring-shaped projection position marker 26 may be provided aside from reservoir groove 25.

The next step for origin adjustment is shown in FIG. 2. Positioning member 22 is made to interact with contacting part 21 by relatively rotating first member 11 and second member 12 in a state of positioning member 22 projecting.

Here, a description is made for how interaction of positioning member 22 with contacting part 21 is judged. The interaction may be judged by monitoring torque generated by a current of a driving motor for relatively rotating first member 11 and second member 12, thus allowing stable judgment. In this way, judgment can be made without requiring a signal generating device such a switch to be provided, thus dispensing with a special signal line for origin adjustment. This brings advantages in that the number of cables does not need to be increased, or that the type of the cables are not required to be changed.

Here, instead of the above-mentioned torque monitoring, interaction may be judged sensuously (e.g. visually) by the robot operator.

In the next step for origin adjustment, after making positioning member 22 interact with contacting part 21 at a position of a mechanical origin, the position is registered in a storage medium or in memory of the control unit such as a computer. This completes the origin adjustment. Here, this registering action is to be executed by a robot control unit or the like that composes and controls the robot.

When the position of a mechanical origin is different from that of interaction, a calculating means preliminarily measures the difference between these positions (or angles) before origin adjustment is needed, and then determines an origin position that is a mechanical origin position calculated from an interaction position and the known difference. The origin adjustment completes by registering the origin position. The calculating and registering actions are executed by the robot control unit, for example.

After the origin adjustment completes, positioning member 22 is embedded into first member 11. At this moment, positioning member 22 slides through guide 24, and a lubricant stored in lubricant reservoir groove 25 provided on the side effectively lubricates the side of positioning member 22 and guide 24. This prevents accuracy deterioration of the side of positioning member 22 and guide 24 due to abrasion, allowing stable origin adjustment over a long duration.

As mentioned above, positioning member 22 is embedded in first member 11, and additionally projection position marker 26 is provided so that part of screw 27 remains fixed to attaching part 23 even when positioning member 22 projects, and thus positioning member 22 will not be removed from attaching part 23. Therefore, one positioning member 22 always corresponds to one attaching part 23, which means that other positioning member 22 will not be attached to certain attaching part 23. This prevents deviation in origin adjustment due to the influence of individual differences among positioning members 22, enabling stable origin adjustment.

Second Exemplary Embodiment

Figure 6:
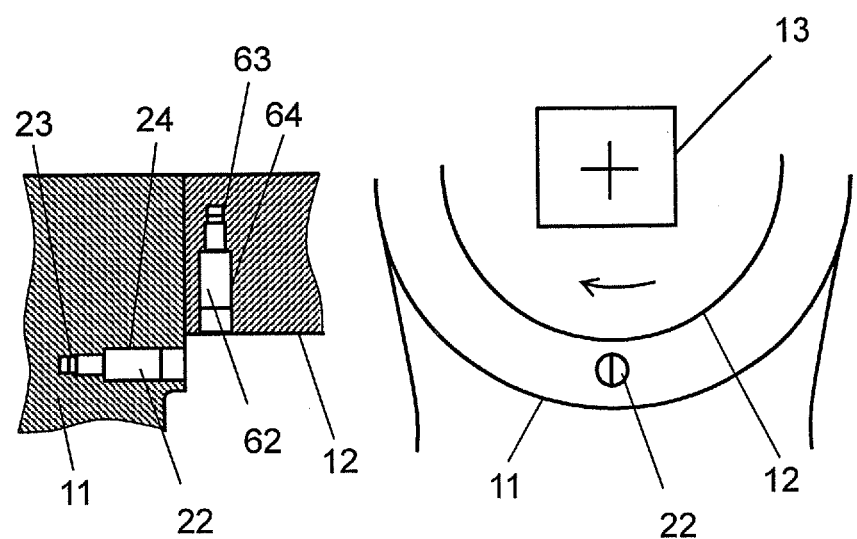
FIG. 6 is an explanatory diagram illustrating the portion of the origin adjusting device of an industrial robot in regular operation, according to the second exemplary embodiment of the present invention.
Figure 7:
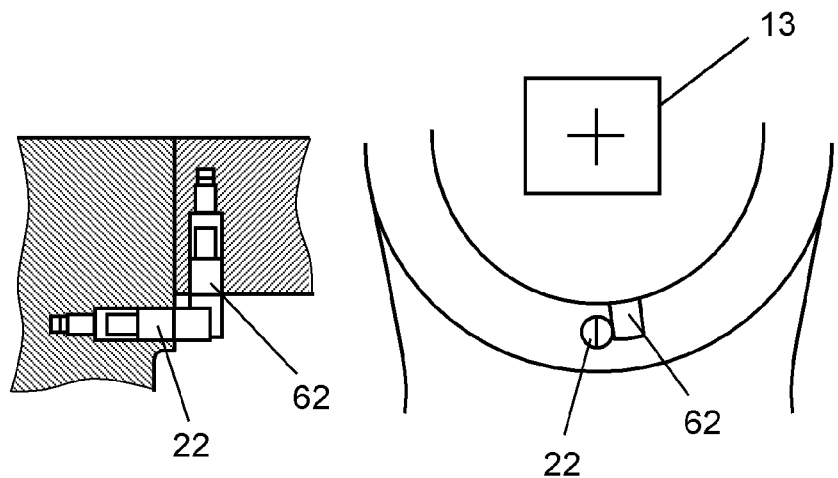
FIG. 7 is an explanatory diagram illustrating the portion of the origin adjusting device of an industrial robot in origin adjustment, according to the second exemplary embodiment of the present invention.
Figure 8:
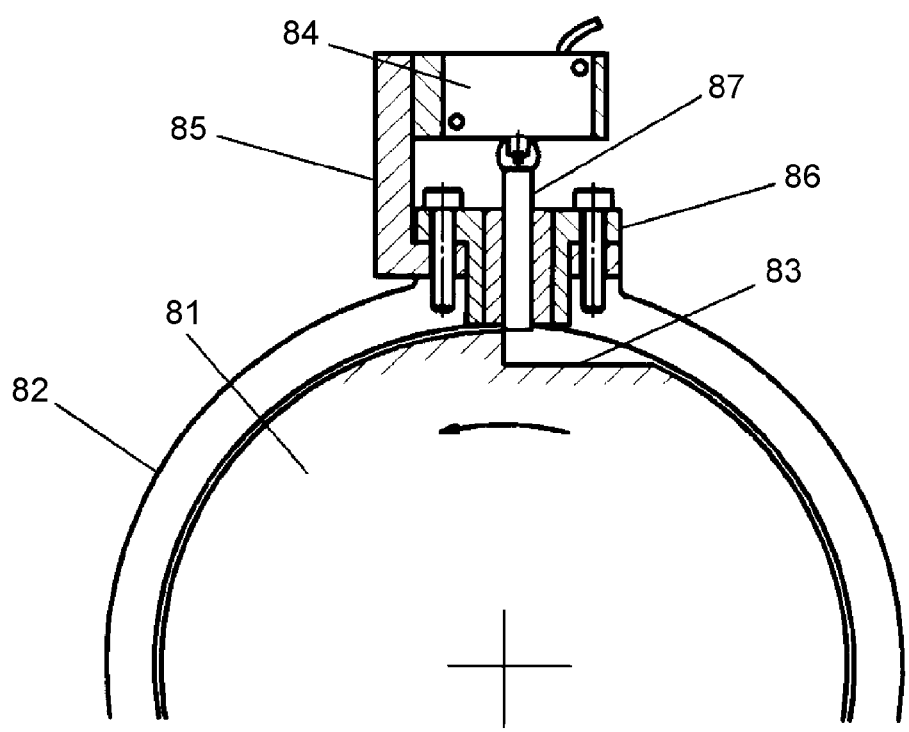
FIG. 8 illustrates an origin adjusting device of a conventional industrial robot.
Figure 9:
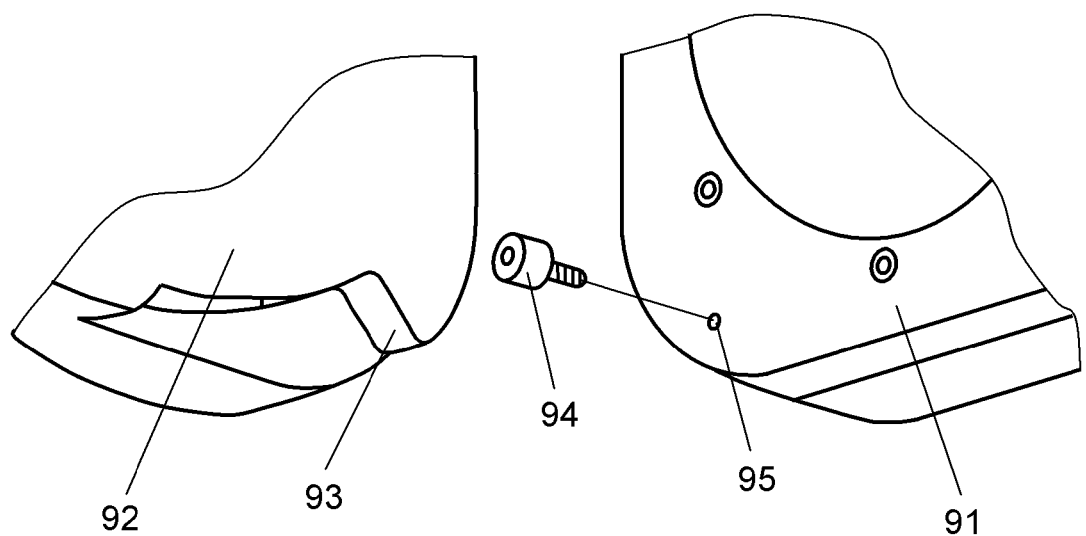
FIG. 9 illustrates an origin adjusting device of another conventional industrial robot.
Figure 10:
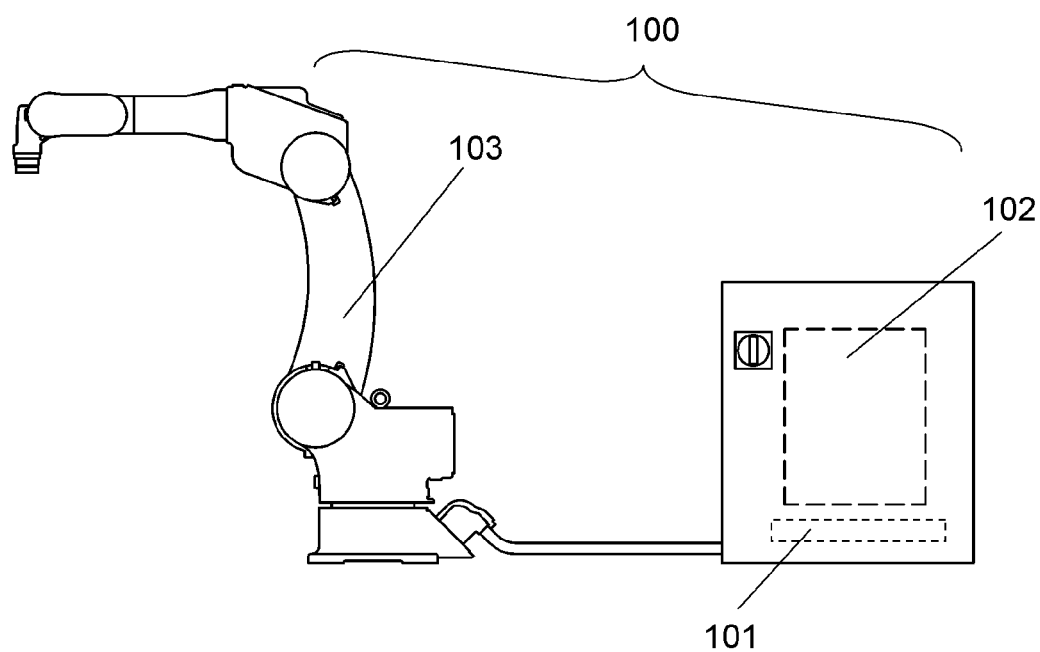
FIG. 10 illustrates a schematic industrial robot.

FIGS. 6 and 7 illustrate the portion of the origin adjusting device of an industrial robot according to the second exemplary embodiment of the present invention. In FIGS. 6 and 7, components with the same makeup as in FIGS. 1 and 2 is given the same marks and the explanation is omitted.

In this embodiment, instead of contacting part 21 provided on second member 12 in the first exemplary embodiment, second member 12 is provided with positioning member 62 and guide 64 which is a second hole through in which positioning member 62 projectably slides. The bottom surface of guide 64 is provided thereon with attaching part 63 of positioning member 62. As shown in FIG. 7, when two positioning members 22 and 62 are projecting through the hole, positioning members 22 and 62 can contact each other. This makeup allows implementing origin adjustment having the equivalent functions to those in the first exemplary embodiment. Here, positioning member 62, guide 64, and attaching part 63 in the second member correspond to second positioning member 62, second guide 64, and second attaching part 63, respectively.

In the first exemplary embodiment, contacting part 21 is exposed outwardly. Therefore, contacting part 21 requires dust prevention measures to avoid aged deterioration and the like for highly accurate origin adjustment. In the second exemplary embodiment, such contacting part 21 is not provided. Consequently, positioning members 22 and 62 are in a state of being embedded in guides 24 and 64, respectively, when the robot performs regular actions, as shown in FIG. 6, thus implementing a structure with complete dust prevention. Therefore, further stable origin adjustment over a long duration can be implemented as compared to the structure in the first exemplary embodiment, where contacting part 21 is always exposed outwardly.

Additionally, in spite of the fact that the positioning member is incorporated in the relatively rotating member in the present invention, a signal generating device (e.g. switch) is not required. This makeup can omit a special signal line for origin adjustment, thus bringing advantages of not requiring the number of cables to be increased, and/or the type and/or arrangement of cables to be changed, in the robot body. Particularly at the leading end of the wrist shaft, where cables are difficult to arrange, origin adjustment that is highly accurate and extremely trouble-saving will be realized.

The reservoir groove for lubricant provided on the side of the positioning member will bring long-term lubricating effect when the positioning member slides through the guide. Further, the reservoir groove functions as a projection position marker indicating a given projection length, thus preventing accuracy deterioration and breakage of the positioning member due to slipping down from the guide and the like.

INDUSTRIAL APPLICABILITY

An industrial robot according to the present invention can perform highly accurate origin adjustment with simple makeup, thus being useful as an industrial robot particularly for manufacturing used on a manufacturing line or the like.

The invention claimed is:

1. An industrial robot having a joint,
wherein the joint includes a first member and a second member rotatable relative to the first member, wherein the first member includes
a first hole provided in the first member, the first hole being provided with a screw hole at a bottom of the first hole, and
a first positioning member contained in the first hole, the first positioning member being slidable through an inside of the first hole and projectable from the first hole, the first positioning member having a screw directly fixed to one end thereof,
wherein the first hole and the first positioning member are arranged such that there is no mechanical backlash between the first hole and the first positioning member,
wherein the screw of the first positioning member is screwed into the screw hole of the first hole such that the first positioning member is attached to the first hole,
wherein the second member includes a contacting portion arranged to contact the first positioning member when the first positioning member is projected from the first hole,
wherein the first positioning member includes a retainer for a lubricant on a side thereof, and
wherein the first positioning member is mounted within the first hole so as to be movable between a position in which an entirety of the first positioning member is arranged within the first hole, and a position in which the first positioning member projects from the first hole, while remaining attached at the bottom of the first hole by the screw and the screw hole.

2. The industrial robot as claimed in claim 1,
wherein the contacting portion is a projection on a side of the second member, and
wherein the projection is formed at a position where the projection can contact the first positioning member when the first positioning member is projected.

3. The industrial robot as claimed in claim 1,
wherein the contacting portion of the second member comprises:
a second hole formed in the second member;
a second positioning member contained in the second hole, the second positioning member being projectable from the second hole; and
an attaching member configured to fix the second positioning member at a bottom of the second hole,
wherein the second positioning member is configured to contact the first positioning member when both the first projecting member and the second projecting member are projected.

4. The industrial robot as claimed in claim 3,
wherein the second positioning member includes a second marker on a side thereof, and the second marker indicates a projection length of the second positioning member.

5. The industrial robot as claimed in claim 3, wherein the second marker is a ring-shaped groove.

6. The industrial robot as claimed in claim 3, wherein the ring-shaped groove is configured to retain the lubricant.

7. The industrial robot as claimed in claim 1, wherein the entire first positioning member is contained in the first hole when the joint performs a regular action, and the first positioning member is projected from the first hole when the joint performs origin adjustment.

8. The industrial robot as claimed in claim 1, wherein the first positioning member contacts the contacting portion at a position of a mechanical origin of the joint.

9. The industrial robot as claimed in claim 1, further comprising a calculator,
wherein the first positioning member contacts the contacting portion at a position displaced by a given angle from a position of a mechanical origin of the joint, and
wherein the calculator calculates the position of the mechanical origin using the given displacement angle and the contact position of the first positioning member.

10. The industrial robot as claimed in claim 1, further comprising a control unit,
wherein the joint further includes a driving motor for relatively rotating the first member and the second member, and
wherein the control unit monitors torque owing to a current of the motor and judges presence or absence of contact of the first positioning member with the contacting portion.

11. An industrial robot having a joint,
wherein the joint includes a first member and a second member rotatable relative to the first member, wherein the first member includes
   a first hole provided in the first member, the first hole being provided with a screw hole at a bottom of the first hole, and
   a first positioning member contained in the first hole, the first positioning member being slidable through an inside of the first hole and projectable from the first hole, the first positioning member having a screw directly fixed to one end thereof,
wherein the first hole and the first positioning member are arranged such that there is no mechanical backlash between the first hole and the first positioning member,
wherein the screw of the first positioning member is screwed into the screw hole of the first hole such that the first positioning member is attached to the first hole,
wherein the second member includes a contacting portion arranged to contact the first positioning member when the first positioning member is projected from the first hole,
wherein the first positioning member includes a first marker on a side thereof, and the first marker specifically indicates a projection length of the first positioning member, and
wherein the first positioning member is mounted within the first hole so as to be movable between a position in which an entirety of the first positioning member is arranged within the first hole, and a position in which the first positioning member projects from the first hole, while remaining attached at the bottom of the first hole by the screw and the screw hole.

12. The industrial robot as claimed in claim 11, wherein the first positioning member further includes a retainer for a lubricant on a side thereof.

13. The industrial robot as claimed in claim 11, wherein the first marker is a ring-shaped groove.

14. The industrial robot as claimed in claim 13, wherein the ring-shaped groove is configured to retain a lubricant.

15. The industrial robot as claimed in claim 11,
wherein the contacting portion is a projection on a side of the second member, and
wherein the projection is formed at a position where the projection can contact the first positioning member when the first positioning member is projected.

16. The industrial robot as claimed in claim 11,
wherein the contacting portion of the second member comprises:
   a second hole formed in the second member;
   a second positioning member contained in the second hole, the second positioning member being projectable from the second hole; and
   an attaching member configured to fix the second positioning member at a bottom of the second hole,
wherein the second positioning member is configured to contact the first positioning member when both the first projecting member and the second projecting member are projected.

17. The industrial robot as claimed in claim 16,
wherein the second positioning member includes a second marker on a side thereof, and the second marker indicates a projection length of the second positioning member.

18. The industrial robot as claimed in claim 17, wherein the second marker is a ring-shaped groove.

19. The industrial robot as claimed in claim 18, wherein the ring-shaped groove is configured to retain a lubricant.

20. The industrial robot as claimed in claim 11, wherein the entire first positioning member is contained in the first hole when the joint performs a regular action, and the first positioning member is projected from the first hole when the joint performs origin adjustment.

21. The industrial robot as claimed in claim 11, wherein the first positioning member contacts the contacting portion at a position of a mechanical origin of the joint.

22. The industrial robot as claimed in claim 11, further comprising a calculator,
   wherein the first positioning member contacts the contacting portion at a position displaced by a given angle from a position of a mechanical origin of the joint, and
   wherein the calculator calculates the position of the mechanical origin using the given displacement angle and the contact position of the first positioning member with the contacting portion.

23. The industrial robot as claimed in claim 11, further comprising a control unit,
   wherein the joint further includes a driving motor for relatively rotating the first member and the second member, and
   wherein the control unit monitors torque owing to a current of the motor and judges presence or absence of contact of the first positioning member with the contacting portion.

* * * * *